(12) United States Patent
DeCusatis et al.

(10) Patent No.: US 9,124,536 B2
(45) Date of Patent: Sep. 1, 2015

(54) MANAGING DATA FLOWS IN OVERLAY NETWORKS

(71) Applicant: International Business Machines Corporation, Armonk, NY (US)

(72) Inventors: Casimer M. DeCusatis, Poughkeepsie, NY (US); Keshav G. Kamble, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/104,455

(22) Filed: Dec. 12, 2013

(65) Prior Publication Data

US 2015/0172183 A1      Jun. 18, 2015

(51) Int. Cl.
*H04L 12/721* (2013.01)
*H04L 12/931* (2013.01)

(52) U.S. Cl.
CPC .............. *H04L 45/72* (2013.01); *H04L 49/354* (2013.01)

(58) Field of Classification Search
CPC ......... H04L 45/00; H04L 45/72; H04L 45/74; H04L 9/00; H04L 9/10; H04L 9/354; H04L 9/35

See application file for complete search history.

(56) References Cited

U.S. PATENT DOCUMENTS

| | | | | |
|---|---|---|---|---|
| 8,750,288 | B2 * | 6/2014 | Nakil et al. | 370/351 |
| 2011/0320632 | A1 * | 12/2011 | Karino | 709/238 |
| 2013/0061047 | A1 | 3/2013 | Sridharan et al. | |
| 2015/0103838 | A1 * | 4/2015 | Zhang et al. | 370/401 |

* cited by examiner

*Primary Examiner* — Anh Ngoc Nguyen
(74) *Attorney, Agent, or Firm* — Cantor Colburn LLP; Steven Chiu

(57) ABSTRACT

Embodiments relate to managing data flows at a virtual forwarding element. A system for managing data flows is provided. The system includes a network interface card (NIC) attached to or integrated with a host. The system is configured to perform a method. The method receives a plurality of data flows from a virtual forwarding element executing in the host. The plurality of data flows originate from a plurality of virtual machines executing in the host. Each of the plurality of data flows carries a different network identifier and a different tunnel header. The method maps, by the NIC, a plurality of tunnels defined by the plurality of tunnel headers to the plurality of data flows using the plurality of network identifiers. The method sends the plurality of data flows out of the host through the plurality of tunnels.

5 Claims, 8 Drawing Sheets

MANAGING DATA FLOWS IN OVERLAY NETWORKS

BACKGROUND

The present invention relates to computer networks, and more specifically, to managing data flows in overlay networks.

In a data center environment, a typical host machine runs many virtual machines (VMs) that provide services to or receive services from other virtual or non-virtualized machines. In providing or receiving services, the VMs in the host may communicate among each other or may communicate with other VMs executing in other hosts. The communications between the machines are in the form of data flows, which include data packets that have common properties (e.g., common headers). In some cases, the VMs in the host share one or more network interface cards attached to the host to send or receive data flows.

SUMMARY

Embodiments include a method, system, and computer program product for managing data flows. According to an embodiment of the present invention, a system for managing data flows is provided. The system includes a network interface card (NIC) attached to or integrated with a host. The system is configured to perform a method. The method receives a plurality of data flows from a virtual forwarding element executing in the host. The plurality of data flows originate from a plurality of virtual machines executing in the host. Each of the plurality of data flows carries a different network identifier and a different tunnel header. The method maps, by the NIC, a plurality of tunnels defined by the plurality of tunnel headers to the plurality of data flows using the plurality of network identifiers. The method sends the plurality of data flows out of the host through the plurality of tunnels.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
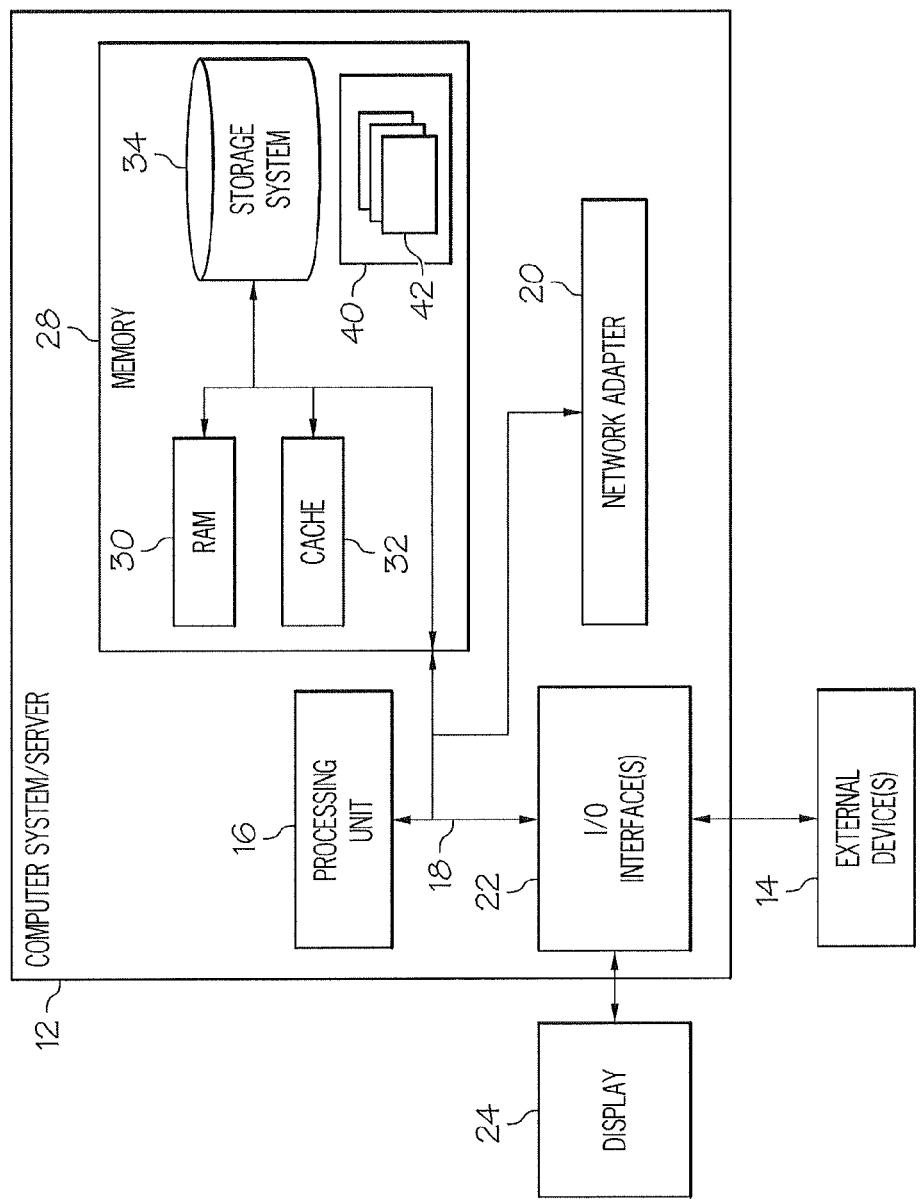
FIG. 1 depicts a cloud computing node in accordance with an embodiment.

Exemplary embodiments relate to managing data flows at a host by a virtual forwarding element (e.g., a virtual switch, a virtual router, etc.) executing in the host and by a NIC that is attached to or integrated with the host. In an embodiment, the virtual forwarding element identifies overlay networks and tunnels for transmitting the data flows out of the host. Such identification is based on a mapping between the virtual machines that execute in the host, the virtual machines to which the data flows are sent, the network identifiers identifying the overlay networks, and locations of the virtual machines. In an embodiment, a network controller that configures the virtual forwarding element provides the mapping to the virtual forwarding element. The virtual forwarding element sends the data flows to their respective destinations via the NIC and through the tunnels.

In an embodiment, the virtual forwarding element attaches a different network identifier to the packets of a different data flow. The virtual forwarding element may also encapsulate the packets of a data flow with tunnel headers depending on the locations of the destination of the packets. For instance, for a first data flow that a first virtual machine executing in the host sends to a second virtual machine executing in the same host, the virtual forwarding element executing in the host forwards the first data flow without encapsulating the packets in the first data flow. For a second data flow that the first virtual machine sends to a third virtual machine executing in another host, the virtual forwarding element forwards the second data flow by encapsulating the packets in the second data flow with a tunnel header that defines a tunnel.

While operating, a virtual forwarding element executing in a host may have several tunnels established. These tunnels terminate at other virtual forwarding elements executing in other hosts. When data flows are transmitted from the host to the other hosts through the tunnels, a network interface card (NIC) attached to the host maps the data flows to the tunnels using the network identifiers. In an embodiment, the NIC uses this mapping in order to identify one or more particular data flows when the NIC receives a congestion message from a forwarding element that is downstream with respect to the NIC and the virtual forwarding element. When such message is received, the NIC notifies the virtual forwarding element of the congestion related to the particular flow(s) so that the virtual forwarding element can control data rate for the particular flow(s).

In an embodiment, the virtual forwarding element controls the data rates for the data flows on a per-flow basis using several virtual queues implemented at the virtual forwarding element. These queues store the packets of the data flows before being sent to the packets' respective destinations.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server/host 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., NIC, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
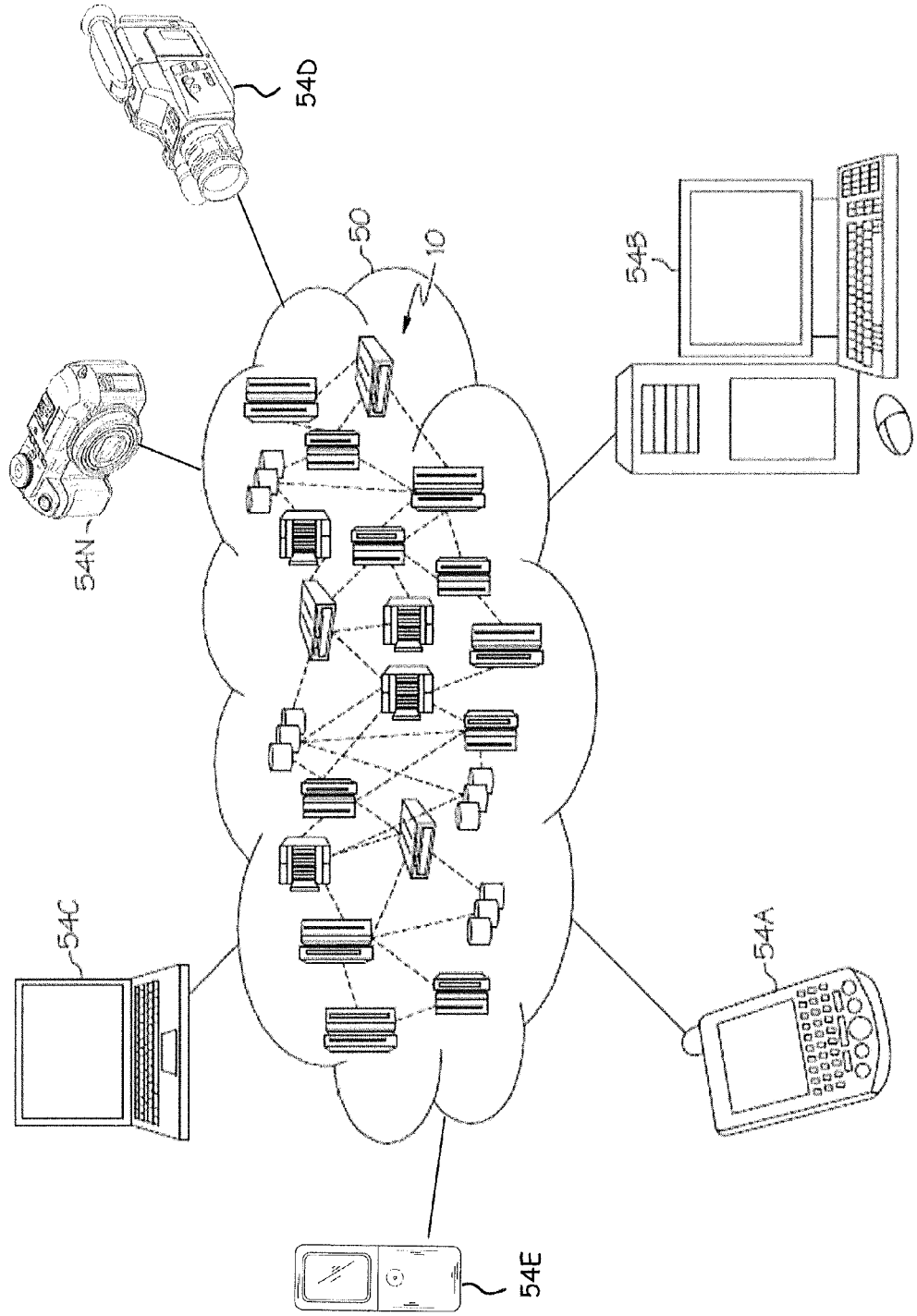
FIG. 2 depicts a cloud computing environment in accordance with an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
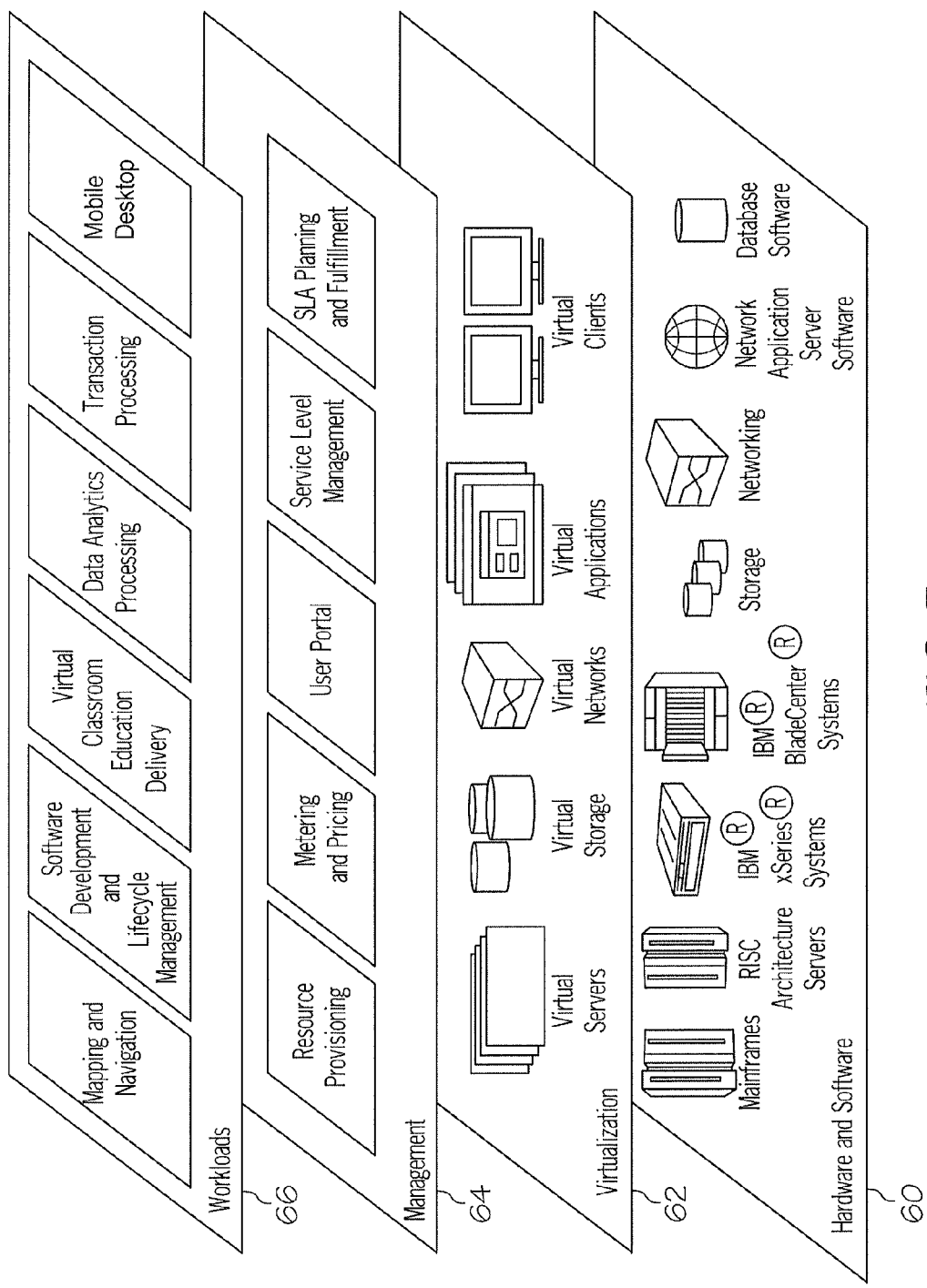
FIG. 3 depicts abstraction model layers in accordance with an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components such as NICs, hubs, switches, routers, bridges, and gateways. Examples of software components include network application server software, in one example IBM WebSphere® application server software; database software, in one example IBM DB2® database software; and software-defined networking software, in one example IBM SDN for Virtual Environments (SDN VE). (IBM, zSeries, pSeries, xSeries, BladeCenter, WebSphere, DB2, and SDN VE are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual overlay networks, virtual private networks, and virtual network elements such as virtual switches, routers; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and mobile desktop.

Figure 4:
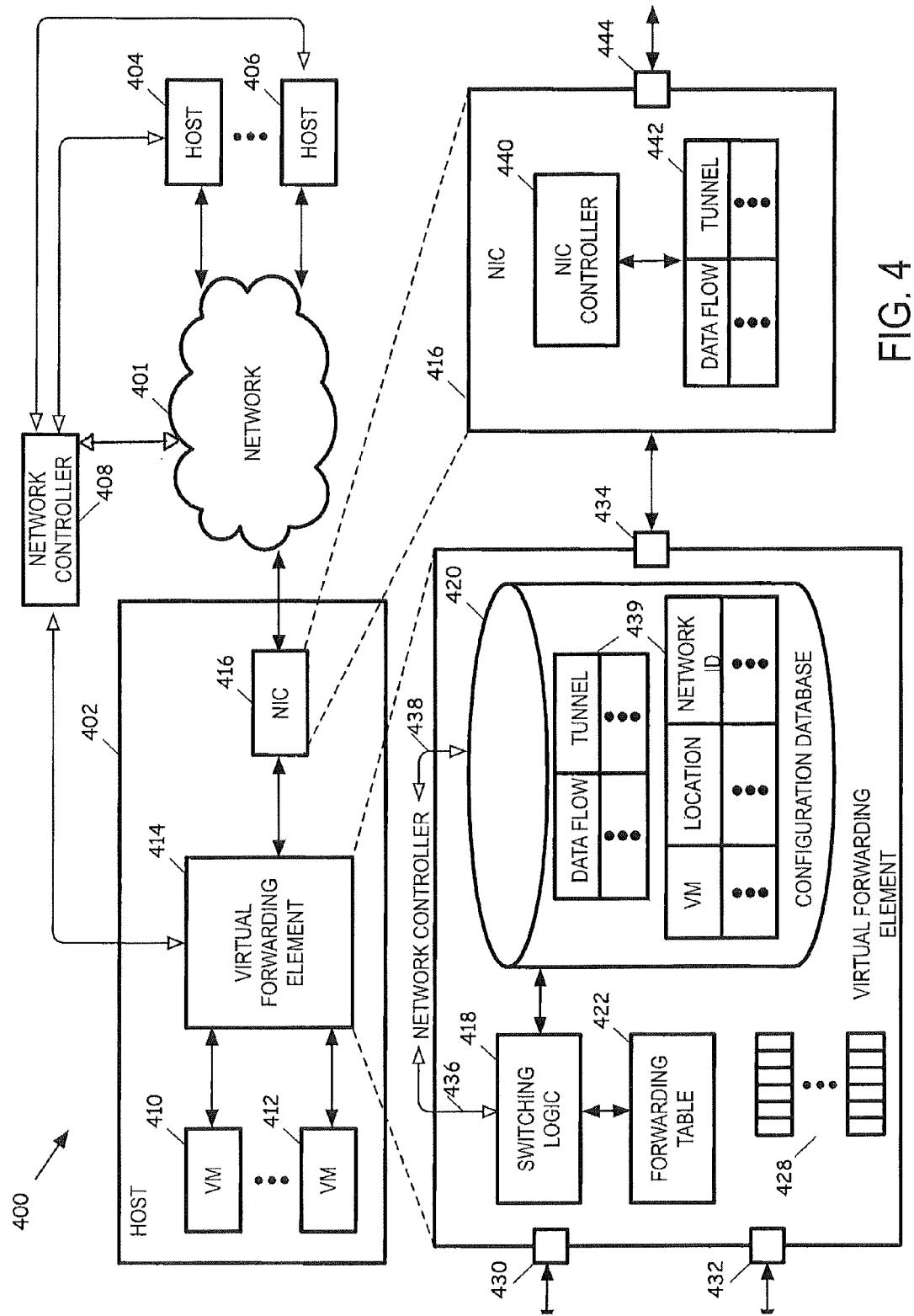
FIG. 4 depicts a block diagram of a system for managing data flows in accordance with an embodiment.

Turning now to FIG. 4, an example of a system 400 will now be described in greater detail. In the example depicted in FIG. 4, the system 400 is a data center environment including several hosts 402, 404, and 406 configured to communicate over the network 401. The system 400 also includes a network controller 408 that manages several overlay networks (not shown) that operate over an underlying network, which in this example is the network 401.

In an embodiment, a host in the system 400 hosts several virtual machines (VMs) and virtual forwarding elements (e.g., virtual switches). Depending on its processing and memory resources, a host may run several hundred VMs and one or more virtual forwarding elements that forward data for the VMs. A host in the system 400 also includes one or more NICs attached to or integrated with the host.

As shown, the host 402 of the system 400 in this example includes several VMs 410 and 412, a virtual forwarding element 414, and a NIC 416. The VMs 410 and 412 are run by a hypervisor (not shown) of the host 402. In an embodiment, the VMs 410 and 412 are end systems that execute client and/or server applications. The VMs 410 and 412 may communicate with each other or with other end systems operating in other hosts of the system 400 through the virtual forwarding element 414. The VMs 410 and 412 may belong to the same tenant or different tenants in the data center environment. In an embodiment, the virtual forwarding element 414 isolates VMs of different tenants such that the data flows coming in and out of a VM of one tenant cannot be seen by a VM of another tenant.

A more detailed diagram of an example of the virtual forwarding element 414 is depicted in the lower left side of FIG. 4. As shown, the virtual forwarding element 414 includes a switching logic 418, a configuration database 420, a forwarding table 422, several buffers 428, and several ports 430, 432, and 434. The switch logic 418 is a control plane that determines actions to perform on incoming data packets for the virtual forwarding element 414. In an embodiment, the network controller 408 configures the switch logic 418 by, e.g., providing flow entries to the switch logic 418 using a protocol (e.g., OpenFlow protocol) for a secure channel 436. The switch logic 418 populates or updates the forwarding table 422, which is a data plane that specifies the port(s) of the virtual forwarding element to which to forward the incoming data packets. In order to populate or update the forwarding table 422, the switch logic 418 uses some of the information stored in the configuration database 420. The information stored in the configuration database 420 is used for configuring the virtual forwarding element 414—a number of ports, data flow mappings, tunnels, views of overlay networks, and network policies (e.g., port isolation, port security, quality of service (QoS), etc.) to name a few. In an embodiment, the network controller 408 provides the information to store in the configuration database 420 using a protocol (e.g., Open vSwitch database (OVS DB) protocol) for a configuration channel 438.

The ports 430, 432, and 434 are virtual ports or virtual interfaces (VIFs) of the virtual forwarding element 414. The virtual forwarding elements 414 receive and send out the packets through these ports. In this example, the port 430 is configured to receive and send packets from and to the VM 410. The port 432 is configured to receive and send packets from and to the VM 412. The port 434 is configured to receive and send packets from and to the NIC 416. In particular, the packets that come in or go out of the virtual forwarding element 414 through the port 434 include packets that are sent to or received from the end systems operating in other hosts of the system 400.

The buffers 428 of the virtual forwarding element 414 are configured to store packets. In an embodiment, some of the buffers 428 are ingress buffers configured to store incoming packets. Some of the buffers 428 are egress buffers configured to store packets after forwarding decisions are made on the packets but before sending the packets out of the virtual forwarding element 414. In an embodiment, the virtual forwarding element 414 uses the buffers 428 to control data rate or to implement QoS.

The network controller 408 is a software defined network controller configured to make routing decisions within the network 401. The network controller 408 establishes one or more secure channels such as the channels 436 and 438 to configure the virtual forwarding elements operating in the hosts and establish communication properties of links (e.g., tunnels) between the virtual forwarding elements. Although the network controller 408 is depicted as a separate component, the network configuration functionality can alternatively be implemented in one or more of the hosts in the system 400 in a standalone or distributed format. The network controller 408 may provide high availability.

As described above, the network controller 408 also manages the overlay networks operating over the network 401. In an embodiment, the overlay networks connect the VMs operating in the hosts of the system 400. Specifically, the network controller 408 assigns an overlay network to a tenant so that the tenant's VMs operating in the hosts can communicate with each other via the assigned overlay network.

In an embodiment, the network controller 408 implements the overlay networks using tunnels that terminate at the virtual forwarding elements of the hosts in the system 400. The network controller 408 monitors the hosts to detect provision or migration of VMs. When a VM for a particular tenant is provisioned in or migrated to a particular host, the network controller 408 directs a virtual forwarding element of the particular host to establish tunnels with virtual forwarding elements in other hosts in which other VMs of the particular tenant operate. Alternatively, the network controller 408 may direct the virtual forwarding element in the other hosts to initiate establishment of the tunnels with the virtual forwarding element in the particular host. The virtual forwarding elements establish tunnels as directed unless the virtual forwarding elements have established such tunnels already.

In an embodiment, the network controller 408 creates and updates a mapping (not shown) between the VMs, VM locations, the overlay networks, and tunnels. The network controller 408 may assign network addresses (e.g., Internet Protocol (IP) and media access control (MAC) addresses) to a VM and use the network addresses to identify the VMs. The network controller 408 may use the network addresses of the host in which a VM operates as the location of a VM. The network controller 408 may assign a network identifier to an overlay network to uniquely identify the overlay network. In an embodiment, a network identifier is a 24-bit value that can uniquely identify more than 16 million overlay networks. The network controller 408 may use the network addresses of the hosts (e.g., IP and MAC addresses of a port of the NIC) to identify the endpoints of the tunnels. In an embodiment, the network controller 408 provides the mapping to the virtual forwarding elements in the hosts by populating or updating the configuration databases of the hosts.

The virtual forwarding elements that operate in the hosts of the system 400 use the provided mapping in order to forward the incoming packets. As shown, the configuration database 420 of the virtual forwarding element 414 includes a mapping provided by the network controller 408, which is depicted as one or more tables 439 in this example. In an embodiment, the table 439 includes the VMs operating in the host 402. Each of the VMs is associated with an overlay network via a network identifier. In the table, a particular VM operating in the host 402 is associated with one or more VMs with which the particular VM can communicate (e.g., the VMs that share the same network identifier with the particular VM). Such VMs may be located in the host 402 or in other hosts. Each pair of the particular VM and the associated VM in the table identifies a data flow because the particular VM is the origin of the packets of the data flow and the other VM in the pair is the destination of the packet in the data flow. That is, the network addresses of the particular VM and the network addresses of the associated VM identify a data flow. In addition to the network addresses of the pair of VMs, the network identifier may be necessary for identifying the data flow uniquely because the address spaces of different overlay networks may overlap.

When the particular VM and the associated VM operate in different hosts of the system 400, the data flow identified by these two VMs and their network identifier is associated with a tunnel. As described above, a tunnel is identified by network addresses of the two hosts. Thus, the data flow is associated with the network addresses of the two hosts. When the particular VM and the associated VM operate in the same host 402, the data flow identified by these two VMs may not have to be associated with a tunnel because the packets of this data flow do not have to leave the host 402.

When the virtual forwarding element 414 forwards packets of a data flow from a VM operating in the host 402 to a VM operating in another host (e.g., the host 404), the virtual forwarding element 414 identifies a tunnel that is associated with this data flow using the mapping and sends the packets through the identified tunnel. That is, the virtual forwarding element 414 encapsulates the packets with a tunnel header that includes the network addresses of the host 402 as the source addresses and the network addresses of the host 404 as the destination addresses. The tunnel header also includes the network identifier associated with this data flow in order to uniquely identify the tunnel ends. One end of this tunnel is the virtual forwarding element 414 because the virtual forwarding element 414 encapsulates the packets of the data flow with the tunnel header. The other end of this tunnel is a virtual forwarding element (not shown) operating in the host 404, which decapsulates the packets of the data flow. That is, the virtual forwarding element that operates in the host 404 strips off the tunnel header and the network identifier from the packets before delivering the packets to the destination VM operating in the host 404. It is to be noted that the virtual forwarding element 414 do not have to rely on broadcasting or multicasting to find the location of the destination VM because the location is provided by the network controller 408.

When the virtual forwarding element 414 forwards data flows from the VMs operating in the host 402 to other VMs operating in other hosts of the system 400, the virtual forwarding element 414 sends the data flows to the NIC 416 through the port 434. A more detailed diagram of an example of the NIC 416 is depicted in the lower right side of FIG. 4. As shown, the NIC 416 in this example includes a NIC controller 440 and a table 442. In an embodiment, the NIC controller 440 is configured to look at not only the tunnel headers of the encapsulated packets received from the virtual forwarding element 414, but also the network identifiers and the inner headers of the encapsulated packets in order to map the data flows to the tunnels. Such mapping is depicted as the table 442. In the table 442, the data flows (identified by the source and destination addresses of the encapsulated packets and their network identifiers) are associated with tunnels through which the data flows are sent. One or more network identifiers may be associated with a single tunnel as the single tunnel's endpoints may host VMs of one or more overlay networks.

When the virtual forwarding element 414 forwards data flows, the virtual forwarding element 414 associates each data flow with one of the buffers 428. The buffers for the data flows allow the virtual forwarding element 414 to control data rate or implement QoS on a per-flow basis. When both the origin and destination of a data flow are VMs in the host 402, the virtual forwarding element 414 uses a buffer associated with this data flow to control the data rate or implement QoS for this data flow. When there are more than two data flows of which the destinations are VMs operating in other hosts of the system 400, the virtual forwarding element 414 uses the buffers associated with the data flows to control the data rate or implement QoS for these data flows.

In an embodiment, the virtual forwarding element 414 assigns different priority levels to the buffers 428 and thereby assigns the priority levels to different data flows. With these buffers with different priority levels, the virtual forwarding element 414 of an embodiment implements enhanced transmission selection (ETS) and priority-based flow control (PFC). That is, the virtual forwarding element 414 may forward data flows by favoring the data flows with higher priority levels over the data flows with lower priority levels or may block or throttle a particular data flow associated with a particular priority level to facilitate lossless transmission of the packets of the particular data flow.

In an embodiment, the NIC 416 uses the mapping between the data flows and the tunnels to help the virtual forwarding element 414 in implementing the ETS and PFC. For instance, the NIC 416 may receive a congestion message for a tunnel. With the mapping, the NIC 416 may identify the data flow associated with the tunnel and notify the virtual forwarding element 414 of the congestion message. The virtual forwarding element 414 may then throttle the data flow using a buffer that is associated with the data flow or send a message to the VM that is the origin of the data flow to throttle the data flow at the VM.

In an embodiment, the NIC shares the mapping between the data flows and the tunnels with one or more middlebox elements (not shown) such as a load balancer, a WAN optimizer, a Network Address Translation (NAT) element, an intrusion detection element, a firewall, etc. In an embodiment, these middlebox elements run as software applications (e.g., virtual machines) in the host 420 and are communicating with the virtual forwarding element 414 and the NIC 416 to provide middlebox services to the VMs running in the host 402. Alternatively or conjunctively, the middlebox elements may be implemented as separate hardware devices that are connected to the host 402 to communicate with the virtual forwarding element 414. These middlebox elements may use the mapping provided by the NIC 416 to provide the middlebox services in a per-flow basis.

In an alternative embodiment, the NIC 416 instead of the virtual forwarding element 414 operates as an end of tunnels established between the hosts. In such embodiment, the NIC 416 is configured to communicate with the network controller 408 to receive the mappings that the network controller 408 creates and updates. The NIC controller 440 encapsulates the packets coming from the virtual machines operating in the host 402 with the tunnel headers before sending the packets out of the host 402.

Figure 5:
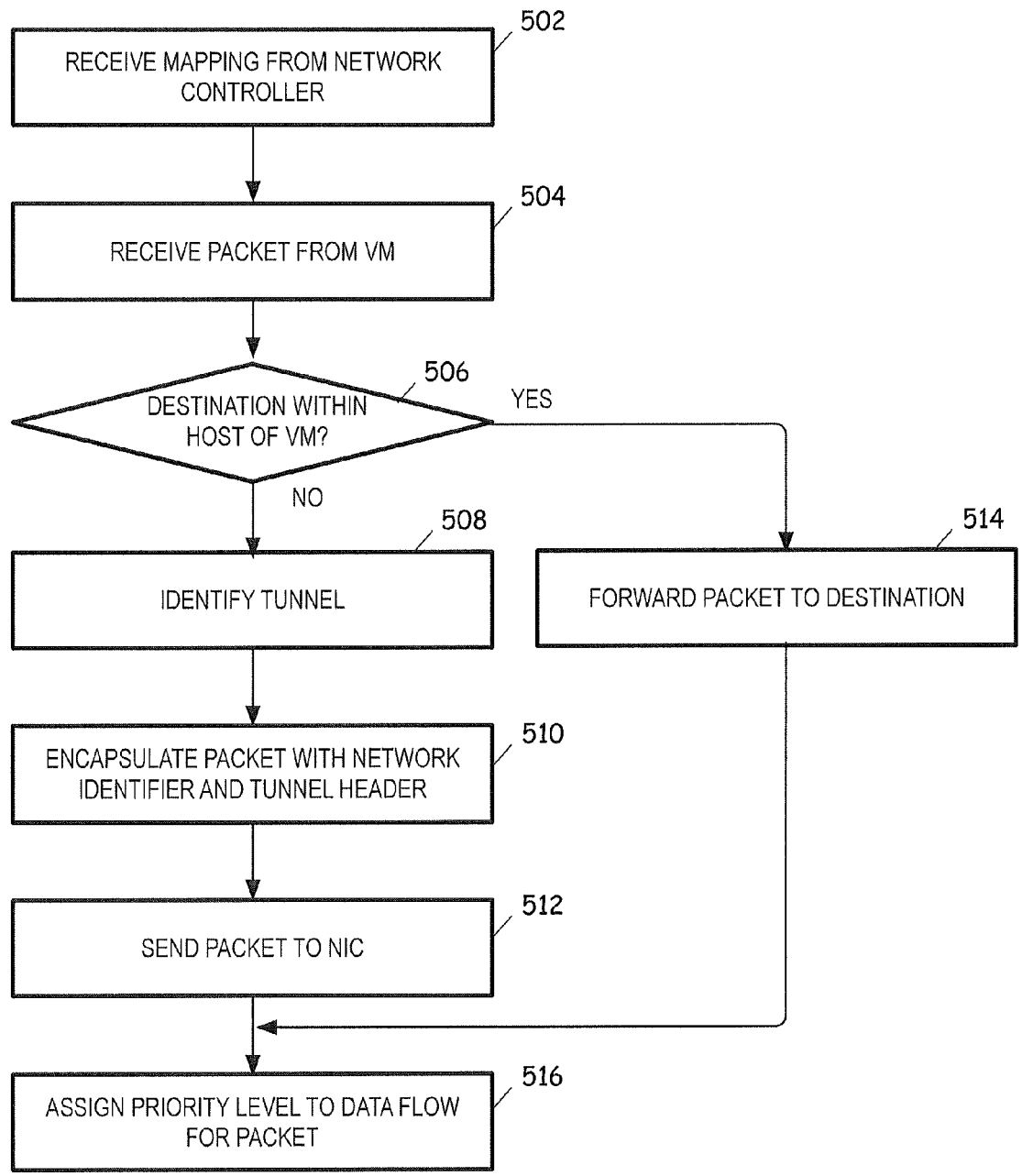
FIG. 5 depicts a flow diagram for forwarding a packet at a virtual forwarding element in a network in accordance with an embodiment.

FIG. 5 depicts a process flow for forwarding a packet at a virtual forwarding element in a network in accordance with an embodiment. In an embodiment, the process flow shown in FIG. 5 is performed by the virtual forwarding element 414 of FIG. 4. At block 502, a mapping from a network controller is received. In an embodiment, this mapping is between the VMs, VMs' locations, the overlay networks, and tunnels for transmitting packets from the VMs to other VMs in other hosts of the system 400 of FIG. 4. In an embodiment, the network controller 408 creates this mapping and updates the mapping whenever the network controller 408 detects a change in the network topology. For instance, the network controller 408 updates the mapping whenever a VM is provisioned at a host or is migrated from one host to another host. In an embodiment, the network controller 408 sends the updates to the mapping to the virtual forwarding element 414 only when the updates is relevant, e.g., only when the VM is provisioned at or migrated to the host 402 and when another VM in another host is to be connected to one of the VMs hosted in the host 402.

At block 504, a packet is received from a VM operating in the host. In an embodiment, this packet is an initial packet of a data flow that originates from the VM and headed to the same destination. For the subsequent packets of this data flow, the virtual forwarding element 414 may not have to perform some or all of the processing described for the blocks 506-516 and may rely on the cache.

At block 506, it is determined whether the destination of the packet is located within the host of the source VM. In an embodiment, this determination is made by looking up the mapping to identify the source VM's network identifier and to identify the location of the destination VM (with the same network identifier). It is determined that the destination is within the host of the source VM when the location of the destination matches the location of the source VM. If it is determined, at block 506, that the destination of the packet is located in the host of the source VM, block 514 is performed to forward the packet to the destination within the host of the source VM. Processing then continues at block 516, which will be described further below.

If it is determined, at block 506, that the destination of the packet is not located in the host of the source VM, the block 508 is performed to identify a tunnel. In an embodiment, the virtual forwarding element 414 identifies the tunnel by looking up the mapping to find a tunnel that has the locations of the source and destination VMs as the tunnel endpoints.

At block 510, the packet is encapsulated with the network identifier of the source VM and the tunnel header of the tunnel identified at block 508. The tunnel header includes the locations of the source and destination VMs, which in an embodiment are network addresses of the hosts of the source and destination VMs. At block 512, the packet is sent to the NIC attached to or integrated with the host of the source VM.

At block 512, a priority level is assigned to the data flow to which the packet belongs. In an embodiment, the virtual forwarding element 414 assigns the priority level to a dataflow by associating the dataflow with a buffer to which the priority level is assigned. In an embodiment, the virtual forwarding element 414 assigns different priority levels to different data flows and uses the priority levels to implement the ETS and PFC on a per-flow basis.

Figure 6:
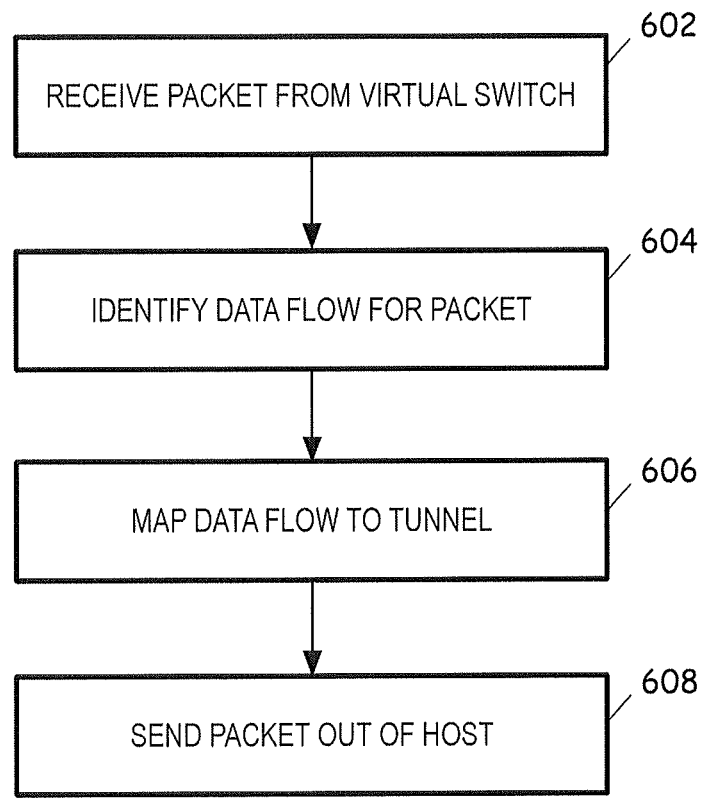
FIG. 6 depicts a flow diagram for managing data flows at a NIC in accordance with an embodiment.

FIG. 6 depicts a process flow for managing data flows at a NIC attached to or integrated with a host of source VMs of the data flows. In an embodiment, the process flow shown in FIG. 6 is performed by the NIC 416 of FIG. 4. At block 602, a packet from a virtual forwarding element operating in the host is received. This packet originates from one of the VMs operating in the host. The packet is encapsulated with a network identifier and a tunnel header by the virtual forwarding element that serves the source VMs. The tunnel header's source and destination addresses include the network addresses of the host and another host in which the destination VM of the packet operates.

At block 604, a data flow to which the packet belongs is identified. In an embodiment, the NIC 416 is configured to look into the network identifier and the inner header of the packet to identify the data flow for the packet. Specifically, the NIC looks at the network addresses of the source and destination VMs in the inner header. The NIC may identify the data flow uniquely based on these network addresses and the network identifier.

At block 606, the data flow identified at block 604 is mapped to a tunnel. In one embodiment, the NIC 416 uses the tunnel header of the packet to identify a tunnel. The NIC 416 maps the data flow (e.g., the source and destination addresses of the VMs and the network identifier) to the tunnel (e.g., the network addresses of the hosts in which the source and destinations VMs operate).

At block 608, the packet is sent out of the host. The packet is then forwarded by the network components of the underlay network based on the information stored in the tunnel header. That is, the network components that are oblivious to the network identifier and the inner header of the encapsulated packet forward the packet to the host of the destination VM.

Figure 7:
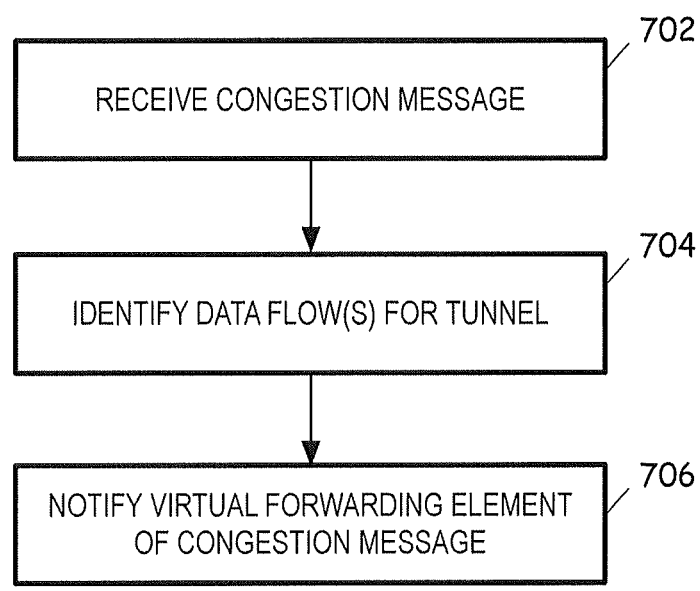
FIG. 7 depicts a flow diagram for handling a congesting message using a mapping between data flows and tunnels in accordance with an embodiment.

FIG. 7 depicts a process flow for handling a congesting message using a mapping between data flows and tunnels. In an embodiment, the process flow shown in FIG. 7 is performed by the NIC 416 of FIG. 4. At block 702, a congestion message is received. This congestion message originates from a network component in the network 401 of FIG. 4 that is downstream with respect to the NIC. The congestion message indicates that the tunneled traffic (e.g., tunneled IP traffic) contributes to the congestion and thus the data rate for the traffic should be adjusted or blocked.

At block 704, one or more data flows are identified for the tunnel. The NIC 416 identifies the tunnel for which the congestion message is received. The NIC 416 uses the mapping that is created at block 606 of FIG. 6 to identify the one or more data flows associated with the tunnel.

At block 706, the virtual forwarding element that sends the data flows to the NIC is notified of the congestion. In an embodiment, the NIC 416 relays the congestion message to the virtual forwarding element. Alternatively or conjunctively, the NIC 416 may specify which of the data flows that the NIC receives from the virtual forwarding element contributes to the congestion. The virtual forwarding element may adjust data rates for the contributing data flows.

Figure 8:
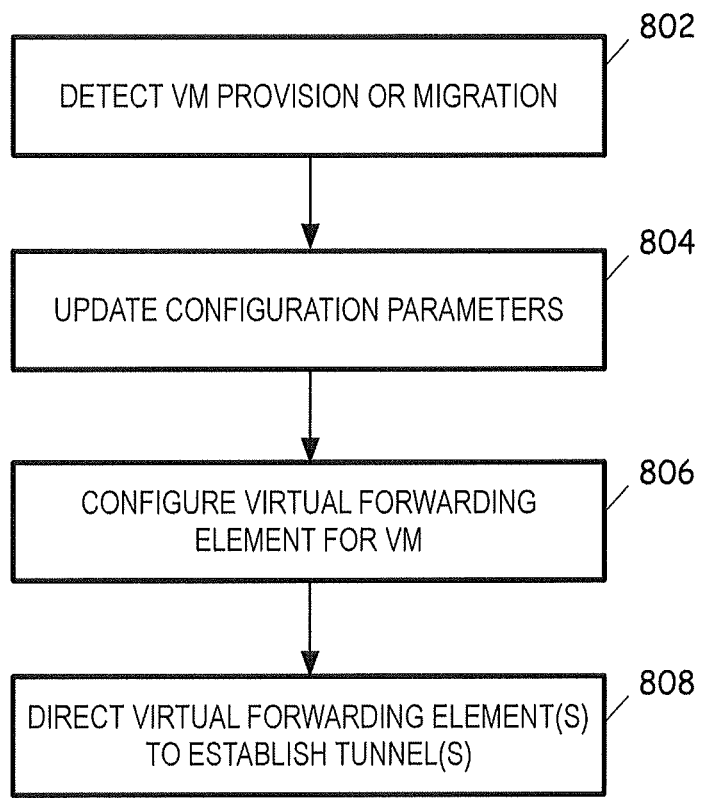
FIG. 8 depicts a flow diagram for configuring virtual forwarding elements in accordance with an embodiment.

FIG. 8 depicts a process flow for configuring virtual forwarding elements. In an embodiment, the process flow shown in FIG. 8 is performed by the network controller 408 of FIG. 4. At block 802, VM provision or migration is detected. The network controller 408 detects provision of a VM at or migration of a VM to one of the virtual forwarding elements that the network controller 408 manages. In an embodiment, the network controller 408 monitors the virtual forwarding element for provision or migration of a VM by polling on the virtual forwarding elements. Alternatively or conjunctively, the network controller 408 configures the virtual forwarding elements or the hypervisors involved in the provision or the migration to the network controller 408.

At block 804, a mapping between configuration parameters is updated. For instance, the network controller 408 assigns a network identifier and network addresses if the VM is newly provisioned. The network controller 408 also maps the VM to a location of the VM if the VM is provisioned or updates the mapping between the VM and its location if the VM is migrated to a new location (e.g., from one host to another). The network controller 408 also maps the VM to the other VMs that share the same network identifier.

At block 806, the virtual forwarding element that serves the provisioned or migrated VM is configured. In an embodiment, the network controller 408 uses the OVS DB protocol to send the configuration parameter updates that are relevant to the virtual forwarding element. The network controller 408 may also send updates to the control plane of the virtual forwarding element so that the virtual forwarding element changes its forwarding behavior according to the updates at the network controller.

At block 808, the virtual forwarding elements are directed to establish tunnels for the provisioned or migrated VM. In an embodiment, the network controller 408 directs the virtual forwarding element serving the VM to establish tunnels with virtual forwarding elements serving other VMs that operate in other hosts and share the same network identifier with the provisioned or migrated VM. Alternatively, the network controller 408 may direct the virtual forwarding elements in the other hosts to initiate establishment of the tunnels with the virtual forwarding element serving the provisioned or migrated VM.

Technical effects and benefits include the ability to control data rates for the data flows on a per-flow basis at a virtual forwarding element regardless of whether the data flows are exchanged between two virtual machines in the same host or two virtual machines in different hosts.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for managing data flows, the system comprising:
a network interface card (NIC) attached to or integrated with a host, the system configured to perform a method comprising:
receiving a plurality of data flows from a virtual forwarding element executing in the host, the plurality of data flows originating from a plurality of virtual machines executing in the host, each of the plurality of data flows carrying a different network identifier and a different tunnel header;
mapping, by the NIC, a plurality of tunnels defined by the plurality of tunnel headers to the plurality of data flows using the plurality of network identifiers; and
sending the plurality of data flows out of the host through the plurality of tunnels.

2. The system of claim 1 further comprising:
receiving a congestion message for a particular tunnel from a forwarding element that is downstream with respect to the NIC and the virtual forwarding element;
identifying a particular data flow based on the mapping between the plurality of tunnels and the plurality of data flows; and
notifying the virtual forwarding element of the congestion message and the particular data flow.

3. The system of claim 2, wherein the virtual forwarding element adjusts data rate for the particular data flow using one of a plurality of queues of the forwarding element.

4. The system of claim 3, wherein the forwarding element creates the plurality of queues for storing the plurality of data flows before sending the data flows to the NIC.

5. The system of claim 1, wherein the forwarding element encapsulates packets of different data flows with the plurality of different tunnel headers.

* * * * *